United States Patent Office 3,780,148
Patented Dec. 18, 1973

3,780,148
PROCESS FOR ENHANCING THE INHERENT
VISCOSITY OF BISPHENOL POLYESTERS
Winston J. Jackson, Jr., Herbert F. Kuhfuss, and John R. Caldwell, Kingsport, Tenn., assignors to Eastman Kodak Company, Rochester, N.Y.
No Drawing. Continuation-in-part of application Ser. No. 11,902, Feb. 16, 1970, now Patent No. 3,684,766, dated Aug. 15, 1972, which is a continuation-in-part of abandoned application Ser. No. 817,137, Apr. 17, 1969. This application June 19, 1972, Ser. No. 263,810
The portion of the term of the patent subsequent to Aug. 15, 1989, has been disclaimed
Int. Cl. C08g 17/08
U.S. Cl. 264—141     4 Claims

ABSTRACT OF THE DISCLOSURE

A bisphenol polyester with an inherent viscosity of at least about 0.5 is produced by the steps of (1) preparing a bisphenol polyester with an inherent viscosity of at least about 0.1, (2) comminuting the prepared polyester, (3) contacting the comminuted polyester with a crystallizing agent, and (4) heating the crystallized polyester in the presence of an inert gas or under reduced pressure to increase the inherent viscosity to at least 0.5. Preferably a copolyester of bisphenol A, terephthalic and isophthalic acid is used and the heating step is accomplished by fluidizing or polymerizing under reduced pressure the crystallized polymer in the same vessel as used for crystallization.

---

This application is a continuation-in-part application of U.S. Ser. No. 11,902 entitled Process for Enhancing the Inherent Viscosity of Bisphenol Polyesters by Jackson, Kuhfuss and Caldwell, filed Feb. 16, 1970, now U.S. Pat. No. 3,684,766, issued Aug. 15, 1972, which in turn is a continuation-in-part application of U.S. Ser. No. 817,137 entitled Improved Process for Preparing Bisphenol A Copolyesters by Jackson, Kuhfuss and Caldwell, filed Apr. 17, 1969, now abandoned.

This invention relates to a process for the preparation of bisphenol polyesters. In one aspect, it relates to the preparation of bisphenol polyesters by the steps of preparing a bisphenol polyester, comminuting the prepared polyester, contacting the comminuted polyester with a crystallizing agent and heating the crystallized polyester in the presence of an inert gas or under reduced pressure to increase the inherent viscosity of the polymer to at least 0.5. In a preferred aspect, this invention relates to a process for the preparation of bisphenol A copolyesters of terephthalic and isophthalic acid wherein the comminuted polymer is crystallized and subsequently fluidized or polymerized under reduced pressure in the same vessel.

Many processes have been reported for preparing bisphenol polyesters with high molecular weights so that they are suitable for uses such as molding plastics and self-supporting film, however, a problem exists in that many of these processes are impractical for one reason or another. Several processes are satisfactory in terms of producing a commercially marketable product but are economically prohibitive. Other processes are economically attractive but produce a commercially unmarketable product.

A typical example of an undesirable process for production of bisphenol polyesters is the melt polymerization method. In this method high reaction temperatures are required because of the high melting points of the reactants, and the high reaction temperatures render the polymers highly colored and commercially unmarketable. Lower reaction temperatures can be used if the polymerization is carried out in a high-boiling solvent, and a desirable non-colored product thereby produced, but long reaction times are required and it is necessary to isolate and wash the polymer, which results in the process producing an economically unattractive product due to the additional processing costs involved.

According to this invention, a bisphenol polyester of desirable commercial properties is economically produced by a series of processing steps, and in a specific embodiment the same vessel is used both for crystallizing and fluidizing or polymerizing the polymer under reduced pressure. Thus, this embodiment of the invention is quite economical since the crystallized polymer does not have to be physically transferred to another vessel for the subsequent step of polymerization.

Accordingly, an object of this invention is to economically prepare a commercially marketable bisphenol polyester. Another object of this invention is to produce bisphenol A copolyesters of terephthalic acid and isophthalic acid. Another object of this invention is to crystallize a comminuted bisphenol polyester in a vessel and subsequently heat the crystallized polymer in the presence of an inert gas or under reduced pressure in the same vessel as used for crystallization of the comminuted polymer. Other objects, advantages and features of the invention will be apparent to those skilled in the art from the specification, including the claims.

Thus, in summary, this invention comprises the steps of (1) preparing a crystallizable bisphenol polyester having an inherent viscosity of at least about 0.1, (2) comminuting the prepared polyester, (3) contacting the comminuted polyester with a crystallizing agent having a boiling point from about 40–300° C., and (4) heating the crystallized polyester in the presence of an inert gas or under reduced pressure to increase the inherent viscosity of the polyester to at least about 0.5. In one specific embodiment of the invention, a bisphenol A copolyester is produced using as the acid component about 65 mole percent terephthalic acid and about 35 mole percent isophthalic acid. In another specific embodiment of the invention, the comminuted polyester is both crystallized and fluidized in the same zone such as a vessel.

The first step of this invention involves preparation of a bisphenol polyester prepolymer having an inherent viscosity of at least 0.1 and preferably the inherent viscosity is in the range of about 0.2 to about 0.4. These polyester prepolymers can be prepared from at least one dicarboxylic acid and at least one bisphenol diester, but the process of this invention is also applicable to bisphenol polyesters prepared by other methods, such as the reaction of bisphenols with diaryl esters of dicarboxylic acids or with dicarboxylic acid chlorides. Preferably, the prepolymers are prepared by melt polymerization, but they also may be prepared in a high-boiling solvent, such as described in British Pat. 1,022,219.

Dicarboxylic acids which may be used for preparing the polyesters can contain from 3 to 20 carbon atoms and can be aliphatic, alicyclic, or aromatic. The aromatic acids are preferred because they give high-melting polyesters. Examples include terephthalic acid, isophthalic acid, 5-tert-butylisophthalic acid, diphenic acid, 4,4'-methylenedibenzoic acid, 4,4'-oxydibenzoic acid, 4,4'-sulfonyldibenzoic acid, naphthalenedicarboxylic acids, chloroterephthalic acid and dichloroterephthalic acid.

Mixtures of the above acids can be used in this invention and in one embodiment of the invention there is used a copolyester wherein the acid component is 50–70 mole percent terephthalic acid and 30–50 mole percent isophthalic acid. This copolyester, particularly when condensed with bisphenol A, has desirable molding properties and is ideally adapted for the production of such items as molded appliance housings and gears. Copolymers containing over about 70 mole percent of terephthalic acid units have very high melting points and, consequently, are difficult to injection-mold. Copolymers containing less than about 50 mole percent of terephthalic acid have lower melting points and are difficult to crystallize sufficiently so that the prepolymers can be built up to satisfactory molecular weights in a fluidized bed.

The bisphenol diester which can be used to form the polyester used in this invention is derived from a bisphenol and a monocarboxylic acid containing from 1 to 8 carbon atoms. Examples of such bisphenol diesters are the diesters of formic, acetic, propionic, butyric and benzoic acid. Mixtures of these acids can be used. The diacetate is preferred in one embodiment where acetic acid is used as the crystallizing agent since only one component, acetic acid, need be recovered from the system during continuous operation. In one embodiment a catalyst, such as magnesium acetate, is beneficial for the production of the bisphenol diester. Bisphenol, including aromatic diols, which can be used include 4,4'-isopropylidenediphenol (also known to those skilled in the art as bisphenol A), 4,4'-thiodiphenol, 4,4'-dihydroxybiphenyl, 4,4'-oxydiphenol, 4,4'-methylenediphenol, 4,4'-(2-norbornylidene) diphenol, 4,4'-isopropylidenebis(2,6-dichlorophenol), hydroquinone, resorcinol, naphthalenediols, and other dihydric phenols listed in U.S. Pats. 3,030,335 and 3,317,466. Aromatic hydroxy acids also may be used, such as m- or p-hydroxybenzoic acid. When a hydroxy acid is used, the hydroxy group is first esterified in the same manner as the hydroxy groups of the bisphenols. The preferred bisphenol is 4,4'-isopropylidenediphenol (bisphenol A) because of the desirable molding characteristics obtained from its polyesters, and particularly from those polyesters wherein it is condensed with terephthalic acid and isophthalic acid to form a copolymer.

The second step of this invention involves comminuting or reducing the low inherent viscosity polyester (which may be called a prepolymer) to small fragments or particles, such as pellets of approximately $\frac{1}{16}$-inch to $\frac{1}{8}$-inch diameter, that is, of sufficiently small size to practice the invention, and is accomplished by methods well known in the art. In one embodiment particles have sizes which pass through on U.S. Standard 10 mesh screen and are retained on a similar 100 mesh screen. In a preferred embodiment, the particles pass a similar 20 mesh screen but are retained on a similar 40 mesh screen.

The third step of this invention involves crystallizing the comminuted prepolymer by contacting the particles with a crystallizing agent. This is accomplished in one specific embodiment by placing the particles in a reactor and contacting the particles with the crystallizing agent in the reactor. This crystallization step is necessary because it increases the melting point of the prepolymers so that the molecular weight can then be built up to a satisfactory value in the reactor without fusing or sticking of the particles. For satisfactory large-scale production, it is necessary to avoid fusing or sticking of the particles.

Crystallizing agents which can be used to crystallize the particles include any material selected by the man reasonably skilled in the art that will crystallize the particles of the particular bisphenol polyester being used to practice the invention and will otherwise operate according to this invention. In general, the most useful crystallizing agents have solubility parameters from about 8–12 and preferably about 8.5–10.5 and a boiling point from about 40–300° C. In one embodiment, the boiling point is below 160° C. so that the crystallization agent can easily be dried from the particles after the crystallization step.

Specifically, crystallizing agents that can be used include the nonhalogenated aromatic and aliphatic ketones, nonhalogenated aliphatic carboxylic acids, esters of carbonic and carboxylic acids, and nonhalogenated hydrocarbons having 2–15 carbon atoms. Halogenated compounds tend to dissolve instead of swell and crystallize the particles, but halogenated hydrocarbons mixed with nonhalogenated materials can be used.

Specific examples of crystallizing agents and their solubility parameters, which can be used to crystallize the prepolymer particles according to this invention include butyl acetate (8.5), ethyl butyrate (8.5), methyl isopropyl ketone (8.5), diethyl carbonate (8.8), diethyl ketone (8.8), butyl propionate (8.8), ethylbenzene, (8.8), mesitylene (8.8), xylene (8.8), toluene (8.9), butyl formate (8.9), ethyl acetate (9.1), benzene (9.2), methyl ethyl ketone (9.3), acetone (9.9), propionic acid (9.9), diethylphthalate (10.0), acetic acid (10.1), and methyl benzoate (10.5). Crystallizing agents other than those specifically mentioned can be selected by a man reasonably skilled in the art in possession of this disclosure.

Mixtures of crystallizing agents can be used according to this invention. Examples of mixtures (parts by weight) which can be used include 60/40 chloroform/acetone, 70/30 dichloroethane/heptane, 50/50 chlorobenzene/toluene, 50/50 cyclohexanone/diisopropyl ketone, and 50/50 heptane/dimethyl malonate.

If the bisphenol diester is the diacetate, it is particularly advantageous to use acetic acid as the crystallizing agent since acetic acid is eliminated during polymerization in the reactor, and it is necessary to recover only one component, acetic acid, during continuous operation of the invention.

The solubility parameters of crystallizing agents disclosed herein are obtained from "Polymer Handbook," section IV, pp. 341–368, edited by J. Brandrup and E. H. Immergut, Interscience Publishers, New York.

Although any amount of crystallizing agent can be used that will otherwise permit practice of the invention, typically, the amount of crystallizing agent used is that which is sufficient to cover the particles in the vessel in which they are retained, which in one embodiment is a fluidized bed reactor.

The time and temperature of the crystallization step can comprise any combination of the two variables that are useful in the practice of this invention. Specifically, after selection of a suitable crystallizing agent by the man reasonably skilled in the art in possessesion of this disclosure, the time and temperature are selected so as to produce a crystallinity in the comminuted polymer sufficient to allow fluidization of the crystallized particles to achieve an inherent viscosity according to the invention of at least 0.5.

Of course, the time and temperature required to attain sufficient crystallinity in the particles so that they can be fluidized satisfactorily depends upon numerous factors such as the type of polyester being used, its molecular weight, and the crystallizing agent selected. In many typical embodiments treatment times of about 0.5 to 5 hours are required; longer times are required at lower temperatures and with some crystallizing agents. The particles of some polyester prepolymers crystallize slowly and will become sticky and fuse together if immediately treated with a hot crystallizing agent. When using polyesters of this type they can be first treated with the selected crystallizing agent at about room temperature for about 1 to 8 hours and some crystallization will occur, after which time the temperature can be increased to complete the crystallization.

Many types of bisphenol polyester prepolymers can be crystallized by the crystallizing agents at room temperature, but quite surprisingly some bisphenol polyesters, such as those of terephthalic and isophthalic acid, do not crystallize sufficiently at room temperature so that, after the solvent is removed, the particles can be fluidized without becoming sticky and fusing together. Many of these prepolymers that do not crystallize at room temperature will crystallize, however, if the mixture is heated to at least 50° C. and preferably to at least 80° C. Specifically, bisphenol A polyesters of terephthalic and isophthalic acid are crystallized at a temperature of at least 80° C. Temperatures up to 150° C. can be used with some crystallizing agents and bisphenol A polyesters. In one embodiment, the fluidization gas can be passed through the crystallization agent at nonfluidization velocity to heat the crystallizing agent and prevent the particles from sticking together.

The fourth step of this invention involves heating the crystallized bisphenol polyester in the presence of an inert gas or under reduced pressure at a time and temperature necessary to achieve an inherent viscosity of at least 0.5 in the polymer. Although the heating step can be accomplished in many ways, such as passing the inert gas through a column containing the particles at nonfluidization velocity, in one specific embodiment of the invention, the heating step is accomplished by fluidizing the crystallized particles. In another specific embodiment, the crystallization and fluidization are accomplished in the same vessel by placing the comminuted particles in a fluidized bed reactor wherein they are first crystallized and subsequently fluidized. In another embodiment the pelletized, crystallized bisphenol polyester may be tumbled in a rotary drier under reduced pressure.

In the embodiment where the crystallization and fluidization are both conducted in the fluidized bed reactor, the solvent can be either drained off or a hot inert gas, such as the fluidization gas, passed up through the mixture to drive off the solvent. When the crystallizing agent is removed by draining from the fluididized bed reactor, a small amount of prepolymer is normally lost due to solution in the solvent. The amount lost is typically about 0.4 to 10 percent of the prepolymer depending upon the chemical structure of the prepolymer, its molecular weight, the type of solvent, the temperature to which the mixture was heated, and the volume of solvent. An advantage of removing the solvent by driving it off with the hot inert gas is to avoid this solubility loss.

Fluidization or reduced-pressure polymerization, as the case may be, is continued until the inherent viscosity is at least 0.5 although in many cases values of 0.6–0.8 are desirable. Values up to 1.0 and even higher can be obtained by this process. The amount of fluidization or vacuum polymerization required depends, of course, upon a number of factors, such as the initial inherent viscosity, the final inherent viscosity desired, the particle size, the fluidization gas flow rate, and fluidization time and temperature. In many embodiments, the fluidization time varies from about 8 hours to about 30 hours, and the vacuum polymerization time varies from about 2 hours to about 12 hours.

Fluidization causes polymerization to take place and the molecular weight increases. As polymerization occurs, an acid is evolved and swept out by the fluidization gas. Nitrogen is the preferred fluidization gas, but other inert gases may be used, such as argon, helium or hydrogen. Since the melting point increases as the molecular weight of the prepolymer increases, it is possible to gradually increase the fluidization temperature as the higher temperatures are desirable due to higher reaction rates. If the temperature is increased too rapidly, the particles begin to become sticky and adhere together. As an example, final fluidization temperature of up to 340° C. can be used with some bisphenol polyesters.

In the embodiment where bisphenol A is used to form copolymers of terephthalic and isophthalic acid, higher amounts of terephthalic acid permit the use of higher temperatures because of higher melting points. In this embodiment, the temperature is rapidly increased from about 25° C. to about 195° C., and then it is gradually increased to about 245° C. for the lower-melting compositions having a 50/50 terephthalic/isophthalic acid mole ratio, and to about 270° C. for the higher-melting compositions containing at least about 65 mole percent of terephthalic acid units. Thus, in this embodiment, fluidization can be conducted within a temperature range of 25–270° C.

In addition to the processing advantages of crystallizing the prepolymer in the same unit used for fluidizing or vacuum polymerizing the prepolymer, an additional advantage is that less sticking together of the polymer particles occurs if the wet crystallized prepolymer particles are dried in the fluidized bed or vacuum reactor. Apparently, the temperatures to which the particles are heated during drying when the crystallizing agent is swept overhead with the fluidization gas causes further crystallization to occur before the solvent is completely removed.

The following examples will further illustrate the invention. All inherent viscosities are determined at 25° C. in 60/40 parts by weight of phenol/tetrachloroethane at a concentration of 0.25 g./100 ml.

Runs 1–16 are conducted to illustrate the practice of the invention when various bisphenols and various dicarboxylic acids are used to form the prepolymer and the crystallization and fluidization steps are conducted in the same fluidized bed reactor according to one preferred embodiment of the invention. These runs include runs 3–6 wherein another preferred embodiment of the invention is illustrated using bisphenol A and an acid component consisting of 65 mole percent terephthalic acid and 35 mole percent isophthalic acid.

The practice of the invention will be described in detail only with respect to run 1 but it is to be understood that runs 2–16 are accomplished similarly to run 1. Data for runs 1–16 are presented in the attached Table 1.

In order to prepare the prepolymer of run 1, a mixture of 0.25 mole bisphenol A diacetate, 0.25 mole isophthalic acid and 0.0025 of magnesium powder as catalyst is placed in a 500-ml. flask equipped with a stirrer and a short head with inlet and outlet for nitrogen. The nitrogen outlet, which is connected to a receiver, has a provision for applying vacuum. The flask and contents are then evacuated and purged three times with nitrogen. The flask is kept under 100 mm. pressure to aid in removing the acetic acid as it is formed and to help prevent air from contacting the reaction mixture. The flask and contents are lowered into a Wood's metal bath maintained at 150° C. Stirring is started and the temperature is raised to 250° C. over a period of 45 minutes. Acetic acid slowly distills from the flask, and elimination of the acetic acid is practically complete after 70 minutes. The temperature of the bath is next increased to 295° C. and held for 20–30 minutes. The melt is clear by this time. The pressure is reduced gradually to approximately 0.5 mm. Hg in 15 minutes. After 30 minutes under full vacuum, a high-melt viscosity prepolymer is obtained. The prepolymer is then cooled under vacuum. The inherent viscosity was about 0.2–0.4.

The prepolymer particles are then comminuted by grinding the polymer into particles which pass a 20 mesh screen.

The crystallization step is then conducted by placing the comminuted particles in a small fluidized bed reactor (insulated glass tube) with sufficient acetone to cover the particles. A water-cooled reflux condenser is attached to the top of the tube to prevent loss of solvent during the crystallizing. The prepolymer is then treated in the fluidized bed reactor with acetone for 1 hour at room temperature (23° C.). After this treatment, the polymer has crystallized sufficiently and no additional crystallization is required. In some cases, additional crystallization is required, and data indicating other times and temperatures used for crystallization are presented in Table 1. The crystallizing agent is not drained from the fluidized bed reactor but is removed by initiating fluidization and carrying the crystallization agent overhead with the hot nitrogen fluidization gas. Similar results are obtained when, after the crystallization step, the solvent is drained from the fluidization column instead of being taken off by the hot nitrogen. The solvent still adhering to the particles is removed by the hot nitrogen during initial fluidization. An advantage of removing the crystallizing agent by draining is that extra heat, an important factor in commercial production, is not needed to volatilize the crystallizing agent as would be required when the solvent is removed with the hot nitrogen.

After the crystallization step is completed, the reflux condenser is removed from the top of the glass tube reactor and the fluidization step is accomplished. During a period of about 1 hour, the temperature is increased from room temperature to 220° C. and held for 4 hours. After all of the solvent has been driven off, the nitrogen flow rate is increased so that fluidization is taking place without blowing the particles out of the tube. The fluidization temperature is progressively increased, as indicated, and held at each of the indicated temperatures for 4 hours and 10 hours, respectively, after which time the polyester then has an inherent viscosity of at least 0.5. Higher inherent viscosities can be obtained by continuing the fluidization for several hours. All the polymers used in runs 1–16 have final inherent viscosities above 0.5 and generally are in the range of 0.56–0.78.

Bisphenol polyester prepolymers are prepared as described above, using dicarboxylic acids and the diacetates of bisphenols listed in the following Table 2. The prepolymers are extruded into rods about 1/16-inch in diameter and cut to give pellets about 1/8-inch in length. The pellets are placed in a small heated glass column and crystallized with solvents as shown in Table 2. The crystallization conditions are listed in Table 2. After the solvent is removed, a small portion of the pellets is removed for polymerization under reduced pressure. Hot nitrogen is passed through the remainder of the pellets in the heated column at the temperatures listed in Table 2. "Fluidization" does not occur because of the large size of the particles (pellets). After the temperature is progressively increased, as indicated, and held at the indicated temperatures for 4 hours, 4 hours and 15 hours, respectively, the polyester has an inherent viscosity of at least 0.5. Higher inherent viscosities can be obtained by continuing the reaction for several hours longer. The final inherent viscosities of the polymers in Table 2 are in the range of 0.54–0.86.

The crystallized prepolymer pellets which are removed for polymerization under reduced pressure are placed in glass tubes which are then evacuated to about 0.1 mm. of mercury. The tubes are then placed in a metal block and heated at the indicated temperatures in Table 2 for 1 hour, 1 hour, and 6 hours, respectively. The final inherent viscosities of the polyesters listed in Table 2 are 0.58–0.88 after this treatment.

It is surprising to find that 1/16- to 1/8-inch pellets of the prepolymer can be solvent crystallized and then built up to high inherent viscosities by heating the pellets while passing an inert gas therethrough or by heating under reduced pressure. It would be expected that (1) it would be very difficult to crystallize large particles, such as pellets about 1/16- to 1/8-inch in diameter, and (2) it would be very difficult to increase the inherent viscosity of these large particles or pellets of the prepolymer to a satisfactory value, that is, at least 0.5 and preferably at least 0.6. This may be accomplished by heating while passing an inert gas (preferably nitrogen) through the pellets or by heating under reduced pressure (preferably less than 2 mm. of mercury).

The advantage of using pellets instead of powder is that a product in pellet form is obtained which can be used for injection-molding, melt-spinning, film extrusion, etc. Since it is difficult to use a powder in these operations, it is generally necessary to convert the powder to pellets by melt extrusion.

When the prepolymer is in pellet form, the preferred inherent viscosity is about 0.3–0.4. At lower inherent viscosities, the pellets are very brittle and tend to break up during handling or during the crystallization step. The preferred solvents for use in the crystallization step with pellets are acetic acid and toluene.

TABLE 1

| Run number | Prepolymer a | | | Crystallization agent b | Crystallization time and temperature in excess of 1 hr. at 23° C. | | Fluidization time and temp. | | | |
|---|---|---|---|---|---|---|---|---|---|---|
| | Bisphenol | Acid | I.V. | | Temp., °C. | Time, hr. | 4 hr., °C. | 4 hr., °C. | 4 hr., °C. | 10 hr., °C. |
| 1 | Bisphenol A | Isophthalic | 0.31 | Acetone | | None | 220 | 240 | 260 |
| 2 | do | do | 0.31 | Benzene | | None | 220 | 240 | 260 |
| 3 | do | 65/35 terephthalic/isophthalic | 0.21 | Acetic acid | 90 | 1 | 220 | 240 | 270 |
| 4 | do | do | 0.21 | Butyl acetate | 125 | 8 | 220 | 240 | 270 |
| 5 | do | do | 0.34 | Toluene | 95 | 4 | 220 | 240 | 270 |
| 6 | do | do | 0.34 | 7/3 ethylene dichloride/heptane | 80 | 5 | 220 | 240 | 270 |
| 7 | 4,4'-cyclohexylmethylenediphenol | Terephthalic | 0.24 | Formic acid | 95 | 2 | 240 | 280 | 320 |
| 8 | 4,4'-(2-norbornylidene)diphenol | 4,4'-sulfonyldibenzoic | 0.28 | Methyl benzoate | 95 | 1 | 250 | 280 | 300 |
| 9 | do | 80/20 terephthalic/azelaic | 0.41 | Xylene | 100 | 1 | 220 | 240 | 260 |
| 10 | 4,4'-(hexahydro-4,7-methanoindan-5-ylidene)diphenol | 4,4'-methylenedibenzoic | 0.22 | Toluene | | None | 250 | 280 | 300 |
| 11 | do | Trans-1,4-cyclohexanedicarboxylic | 0.33 | Diethyl ketone | 95 | 2 | 220 | 240 | 300 |
| 12 | 4,4'-methylenediphenol/bisphenol A | 2,5-naphthalenedicarboxylic | 0.25 | Propionic acid | 100 | 1 | 220 | 240 | 260 |
| 13 | 4,4'-sulfonyldiphenol | 90/10 isophthalic/5-tert-butylisophthalic | 0.28 | Ethyl acetate | 75 | 2 | 220 | 240 | 270 |
| 14 | 60/40 4,4'-methylenediphenol/bisphenol A | Isophthalic | 0.24 | 1/1 chlorobenzene/toluene | | None | 220 | 240 | 270 |
| 15 | 80/20 hydroquinone/resorcinol | 80/20 terephthalic/dichloroterephthalic | 0.30 | Methyl ethyl ketone | 80 | 1 | 220 | 240 | 270 |
| 16 | 5,6,7,8-tetrahydro-1,4 naphthalenediol | 4,4'-oxydibenzoic | 0.30 | Diethyl carbonate | 95 | 1 | 220 | 240 | 270 | a Ratios are molar.
b Ratios are by volume.

TABLE 2

| Prepolymer* | | | | Crystallization time and temperature in excess of 1 hr. at 230° C. | | Fluidization time and temp. | | |
| --- | --- | --- | --- | --- | --- | --- | --- | --- |
| Bisphenol | Acid | I.V. | Crystallization agent | Temp.,° C. | Time, hr. | 4 hr.,° C. | 4 hr.,° C. | 15 hr.,° C. |
| Bisphenol A | Isophthalic | 0.38 | Acetone | 23 | 5 | 220 | 240 | 260 |
| Do | 65/35 terephthalic/isophthalic | 0.40 | Acetic acid | 115 | 1 | 220 | 240 | 270 |
| Do | do | 0.40 | Butyl acetate | 125 | 4 | 220 | 240 | 270 |
| Do | do | 0.40 | Toleune | 90 | 0.5 | 220 | 240 | 270 |
| 4,4'-(2-norbornylidene)diphenol | 4,4'-sulfonyldibenzoic | 0.32 | Methyl benzoate | 95 | 1 | 250 | 280 | 300 |
| Do | 80/20 terephthalic/azelaic | 0.41 | Xylene | 100 | 1 | 220 | 240 | 260 |
| 60/40 4,4'-methylene diphenol/bisphenol A | 2,5-naphthalenedicarboxylic | 0.38 | Propionic acid | 100 | 1 | 220 | 240 | 260 |
| 4,4'-sulfonyldiphenol | 90/10 isophthalic/5-tert-butylisophthalic | 0.36 | Ethyl acetate | 75 | 2 | 220 | 240 | 270 |
| 5,6,7,8-tetrahydro-1,4-naphthalenediol | 80/20 terephthalic/dichloroterephthalic | 0.30 | Methyl ethyl ketone | 80 | 1 | 220 | 240 | 270 |
| Hydroquinone | 70/30 isophthalic/5-phenoxyisophthalic | 0.39 | Toluene | 100 | 1 | 220 | 240 | 260 |

*Ratios are molar.

The invention has been described in detail with particular reference to preferred embodiments thereof, but it will be understood that variations and modifications can be effected within the spirit and scope of the invention.

We claim:

1. A process comprising:
   (A) forming pellets of approximately 1/16 to 1/8 inch diameter of a crystallizable bisphenol polyester having an inherent viscosity of at least 0.1 to about 0.4 determined at 25° C. in 60/40 parts by weight of phenol/tetrachloroethane at a concentration of 0.25 g./100 ml., said polyester prepared from
      (1) an aliphatic, alicyclic or aromatic dicarboxylic acid containing from 3–20 carbon atoms, and
      (2) a bisphenol diester of a bisphenol and a monocarboxylic acid containing from 1–8 carbon atoms;
   (B) crystallizing the polyester pellets by contacting at a temperature of from about room temperature to 150° C. with a crystallizing agent having a boiling point from about 40–300° C. and a solubility parameter from about 8–12 and selected from the group consisting of nonhalogenated ketones, nonhalogenated aliphatic carboxylic acids, nonhalogenated esters of carbonic and carboxylic acid and nonhalogenated aromatic hydrocarbons having 1–15 carbon atoms;
   (C) heating the resulting crystallized polyester pellets at a temperature which avoids fusing or sticking thereof while passing an inert gas therethrough or under reduced pressure to increase the inherent viscosity of the polyester to at least about 0.5 as determined at 25° C. in 60/40 parts by weight of phenol/tetrachloroethane at a concentration of 0.25 g./100 ml.

2. Process according to claim 1 wherein said polyester is prepared from about 65 mole percent terephthalic acid and about 35 mole percent isophthalic acid based on the total moles of dicarboxylic acid, and 4,4'-isopropylidenediphenol; the crystallizing agent is selected from acetic acid or toluene which is contacted with the polyester pellets at a temperature of at least about 80° C.; and the crystallized polyester is heated to within a temperature range of about 25–270° C.

3. Process of claim 1 wherein the contacting with the crystallizing agent and the heating take place within the same processing zone.

4. The process of claim 1 wherein the monocarboxylic acid is selected from the group consisting of formic, acetic, propionic, butyric and benzoic acid and mixtures thereof; the dicarboxylic acid is selected from the group consisting of terephthalic acid, isophthalic acid, 5-tert-butylisophthalic acid, diphenic acid, 4,4'-methylenedibenzoic acid, 4,4'-oxydibenzoic acid, 4,4'-sulfonyldibenzoic acid, naphthalenedicarboxylic acids, chloroterephthalic acid, dichloroterephthalic acid, and mixtures thereof; the bisphenol is selected from the group consisting of 4,4'-isopropylidenediphenol, 4,4'-thiodiphenol, 4,4'-dihydroxybiphenyl, 4,4'-oxydiphenol, 4,4'-methylenediphenol, 4,4'-(2-norbornylidene)-diphenol, 4,4'-isopropylidenebis(2,6-dichlorophenol), hydroquinone, resorcinol, and naphthalenediols and mixtures thereof; and the crystallizing agent has a solubility parameter from about 8–12 and is selected from the group consisting of nonhalogenated ketones, nonhalogenated aliphatic carboxylic acids, nonhalogenated esters of carbonic and carboxylic acid and nonhalogenated aromatic hydrocarbons having 1–15 carbon atoms.

References Cited

UNITED STATES PATENTS 3,684,766   8/1972   Jackson et al. ——————— 260—47 C

LESTER L. LEE, Primary Examiner

U.S. Cl. X.R.

260—47 C; 264—234